(12) United States Patent
Jakesch

(10) Patent No.: US 6,970,868 B2
(45) Date of Patent: Nov. 29, 2005

(54) METHOD FOR ASCERTAINING VALID ADDRESS CODES

(75) Inventor: Wolfgang Jakesch, Reichenau (DE)

(73) Assignee: Siemens Dematic AG, Nuremberg (DE)

( * ) Notice: Subject to any disclaimer, the term of this patent is extended or adjusted under 35 U.S.C. 154(b) by 449 days.

(21) Appl. No.: 10/095,042

(22) Filed: Mar. 12, 2002

(65) Prior Publication Data

US 2002/0133372 A1   Sep. 19, 2002

(30) Foreign Application Priority Data

Mar. 13, 2001 (DE) .................. 101 11 885

(51) Int. Cl.[7] ............................................. G06F 17/30
(52) U.S. Cl. ............................................. 707/6; 382/101
(58) Field of Search ............................. 707/6; 382/101

(56) References Cited

U.S. PATENT DOCUMENTS

| | | | | |
|---|---|---|---|---|
| 5,050,218 A | * | 9/1991 | Ikeda et al. | 382/101 |
| 5,422,821 A | * | 6/1995 | Allen et al. | 700/219 |
| 5,581,628 A | * | 12/1996 | Nakamura et al. | 382/101 |
| 5,659,731 A | * | 8/1997 | Gustafson | 707/4 |
| 5,687,212 A | * | 11/1997 | Kinser et al. | 379/9.03 |
| 5,901,214 A | * | 5/1999 | Shaffer et al. | 379/211.02 |
| 5,984,174 A | * | 11/1999 | Kato et al. | 235/375 |
| 6,291,785 B1 | * | 9/2001 | Koga et al. | 209/584 |
| 6,360,001 B1 | * | 3/2002 | Berger et al. | 382/101 |
| 6,363,392 B1 | * | 3/2002 | Halstead et al. | 707/102 |
| 6,373,012 B1 | * | 4/2002 | Crutchfield et al. | 209/584 |
| 6,539,098 B1 | * | 3/2003 | Baker et al. | 382/101 |
| 6,549,892 B1 | * | 4/2003 | Sansone | 705/401 |
| 6,575,376 B2 | * | 6/2003 | Yu | 235/494 |
| 6,701,307 B2 | * | 3/2004 | Himmelstein et al. | 707/3 |
| 2001/0042055 A1 | * | 11/2001 | Didriksen et al. | 705/407 |

FOREIGN PATENT DOCUMENTS

DE   100 10 241 C1   3/2001

* cited by examiner

*Primary Examiner*—Wayne Amsbury
(74) *Attorney, Agent, or Firm*—Jacob Eisenberg; Siemens AG

(57) ABSTRACT

The invention relates to a method for ascertaining valid address codes for valid address data using an address dictionary which stores all the permissible address details with the associated address codes in searchable form for a particular territory. The address dictionary is automatically searched using the valid address data and all the coarsening stages respectively derived therefrom. The address codes contained in the dictionary entries found for each valid address, including all the associated coarsening stages, are output as a valid address code.

5 Claims, 1 Drawing Sheet

METHOD FOR ASCERTAINING VALID ADDRESS CODES

Figure 1:
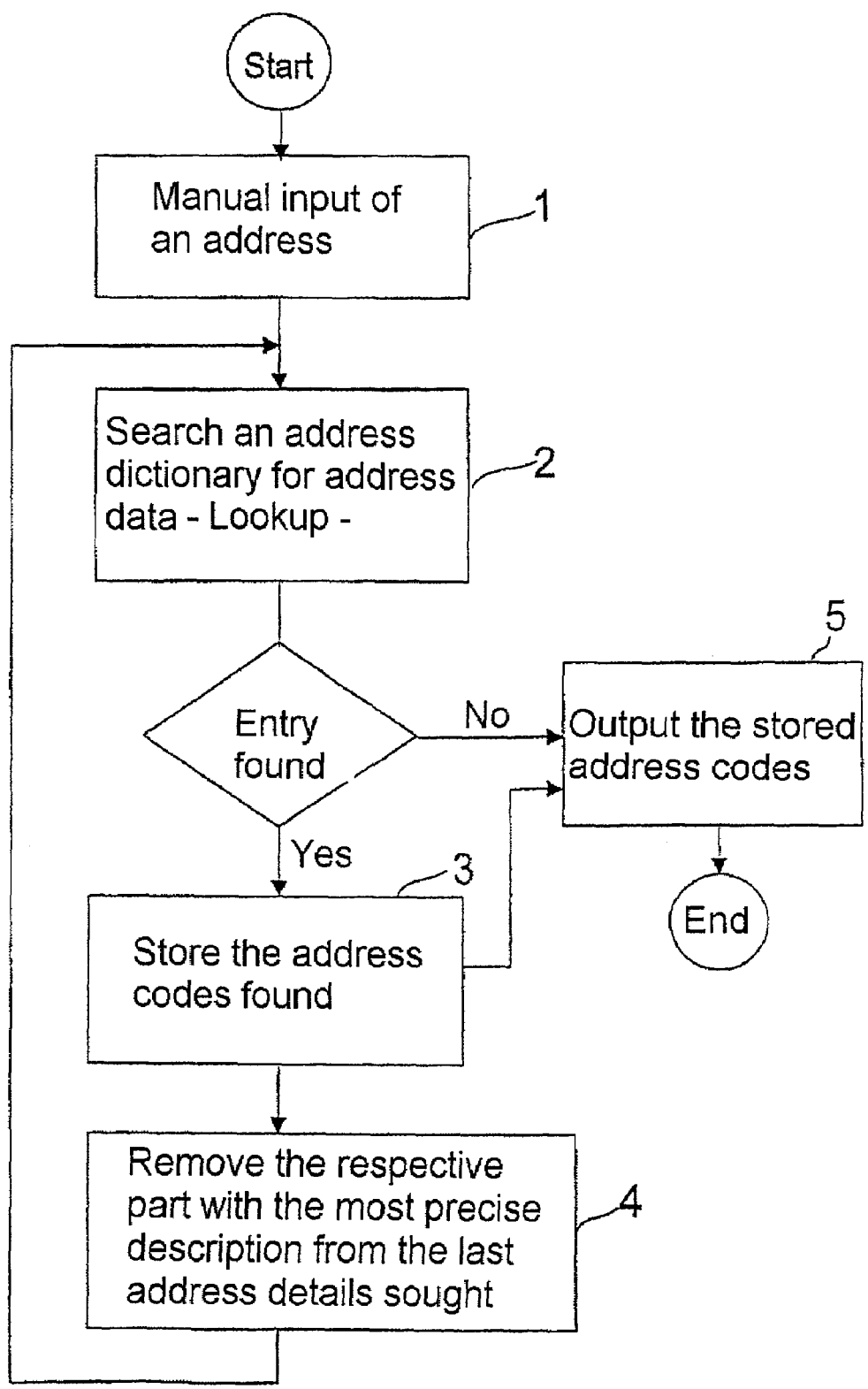

The invention relates to a method for ascertaining valid address codes for valid address data using an address dictionary.

Automatic address reading for dispatches is a technology for sorting and distributing the dispatches which is used throughout the world. In this case, the addresses on the dispatches comprise a postal code, town details, street names, house numbers, possibly apartment numbers and names, and any other identifying details. The postal code comprises either digits (ZIP code in the US, postcode in Germany) and describes the town, or a mixture of digits and letters and describes the address down to the street.

The automatic reading operation in an OCR reader involves reading the characters and then the individual elements of the address. This is followed by matching to the entries in an address dictionary, and the address dictionary is used to ascertain an address code (postal code and other code characters entered in the address database) which describes the address down to house numbers in a street. If the postal code describes the address down to the street, the reading in the OCR unit involves matching the postal code data read and the city and street names read and also house numbers to determine validity.

This technology is not perfect, however. In many cases, the distribution information ascertained during automatic reading does not match the distribution information on the postal dispatch.

Comparison of the address code determined during automatic reading of the address with all the address codes which are valid for this address makes it possible to establish whether the address code determined during automatic reading is correct or incorrect. To do this, it is necessary to ascertain the valid address codes for the respective address.

To obtain valid address data required for this, the address has to date been input manually at a video coding station in accordance with the prior art. In that case, the operator has used the address data which have been input to search an address dictionary containing addresses and associated address codes interactively for corresponding entries with the address codes using a lookup, this search being based on empirical values for the respective operator. The address codes ascertained in this way have then been output as valid address codes.

This practice is time-consuming, susceptible to error and usually does not provide all the valid address codes for an address. Furthermore, the procedure needs to be repeated whenever the lookup is updated.

The invention specified in claim 1 is based on the object of providing a method for ascertaining valid address codes for valid address data using an address dictionary in which all the address codes valid for the address are ascertained in a short time.

On the basis of the invention, the address dictionary, which stores all the permissible address details with the associated address codes in searchable form for a particular territory, is automatically searched using the valid address data and all the coarsening stages respectively derived therefrom. The address codes contained in the dictionary entries found for each valid address, including all the associated coarsening stages, are then output as valid address codes. This eliminates the previously used manual search process in the address dictionary, which is complex and dependent on experience.

It is advantageous for the first coarsening stage to be derived by removing from the full address the part which describes it most precisely, for the second coarsening stage to be derived by removing from the first coarsening stage the part which describes it most precisely, and for this to be continued for as long as an appropriate entry is found in the address dictionary.

Another advantage is for the valid address data to be produced by manual input.

The invention is explained in more detail below in an exemplary embodiment with reference to the drawing, in which:

FIG. 1 shows the method sequence using a flowchart.

To produce valid address data, an address is first input manually 1. Next, an address dictionary storing all the permissible address details with the associated address codes in searchable form for a particular territory is searched for the address data which have been input for this address 2.

If a corresponding entry has been found, the address code contained is stored 3. Next, the part with the most precise description is removed from these address details 4. There is then another search through the address dictionary using these reduced/coarsened address details 2. If an entry has been found, the address code it contains is likewise stored 3 and, from these partially reduced address details, the part which now has the most precise description is likewise removed 4. This method is used to search the address dictionary, etc. This process is carried out until no more entries are found. The address codes stored during this procedure are then output as valid address codes 5, and the ascertainment of the address codes which are valid for the address which has been input is terminated. If the address data which were input did not find any entry in the address dictionary right at the start (incorrect address details), the procedure is terminated immediately.

A US address is used to explain this briefly:
INDEPENDENCE BLUE CROSS
1901 MARKET STREET STE 3
PHILADELPHIA Pa. 19103
The postal code for this address is: 19103-1475-01
The associated address elements are:
City="PHILADELPHIA", State="PA", Zip Code="19103"
Primary Number="1901", Street="MARKET", Suffix="ST"
Secondary Name="STE", Secondary Number="3"
Firm="INDEPENDENCE BLUE CROSS"
The coarsening operations for this are as follows:
1901 MARKET STREET STE 3
PHILADELPHIA Pa. 19103
The postal code for this is: 19103-1400-03
1901 MARKET STREET STE
PHILADELPHIA Pa. 19103
The postal code for this is: 19103-1400-99
1901 MARKET STREET
PHILADELPHIA Pa. 19103
The postal code for this is: 19103-1414-01
PHILADELPHIA Pa. 19103
The postal code for this is: 19103.
PHILADELPHIA Pa.
The postal code for this is: 19100.
These address codes listed here are all the valid address codes for the indicated address.

What is claimed is:

1. A computer implemented method for determining whether an address is valid, comprising the steps of:
   determining a postal code for the address;
   coarsening the address so as to create a coarsened address if the postal code was determined;
   determining another postal code for the coarsened address;
   repeating the steps of coarsening and determining another postal code if the another postal code was determined.

2. The method according to claim 1, wherein the step of coarsening further comprises the step of removing from the address a part which described it most precisely.

3. The method according to claim 2, further comprising the step of repeating the step of repeating until the another postal code is no longer determinable.

4. The method according to claim 3, wherein the step of determining a postal code further comprises the step of encoding the address and searching an address database for the postal code associated with the encoded address.

5. The method according to claim 4, further comprising the step of outputting the postal code and each of the another postal code to a memory.

* * * * *